A. A. FAIR.
TRUCK FOR COB HOUSES AND THE LIKE.
APPLICATION FILED APR. 26, 1915.
1,183,362.
Patented May 16, 1916.
2 SHEETS—SHEET 2.
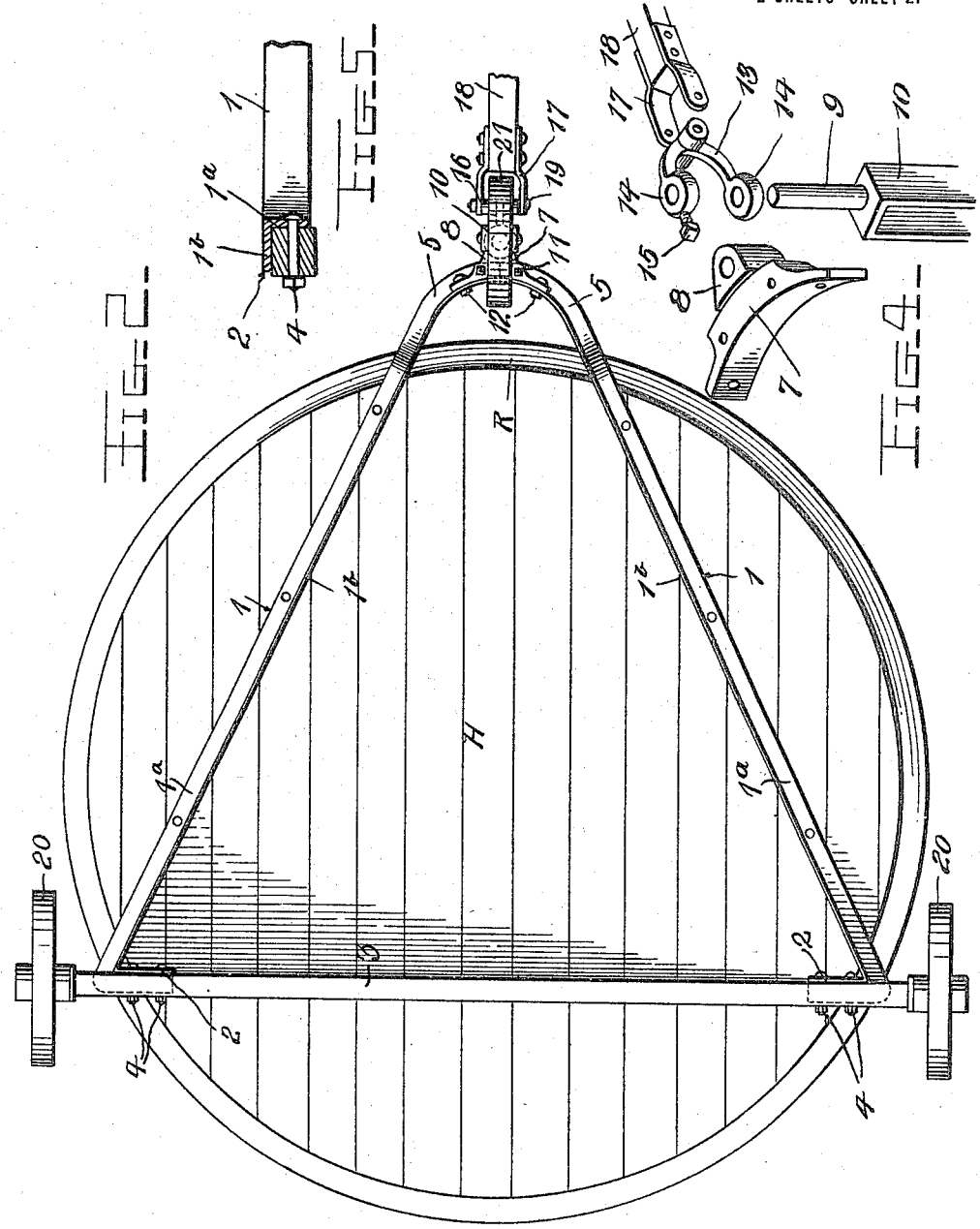

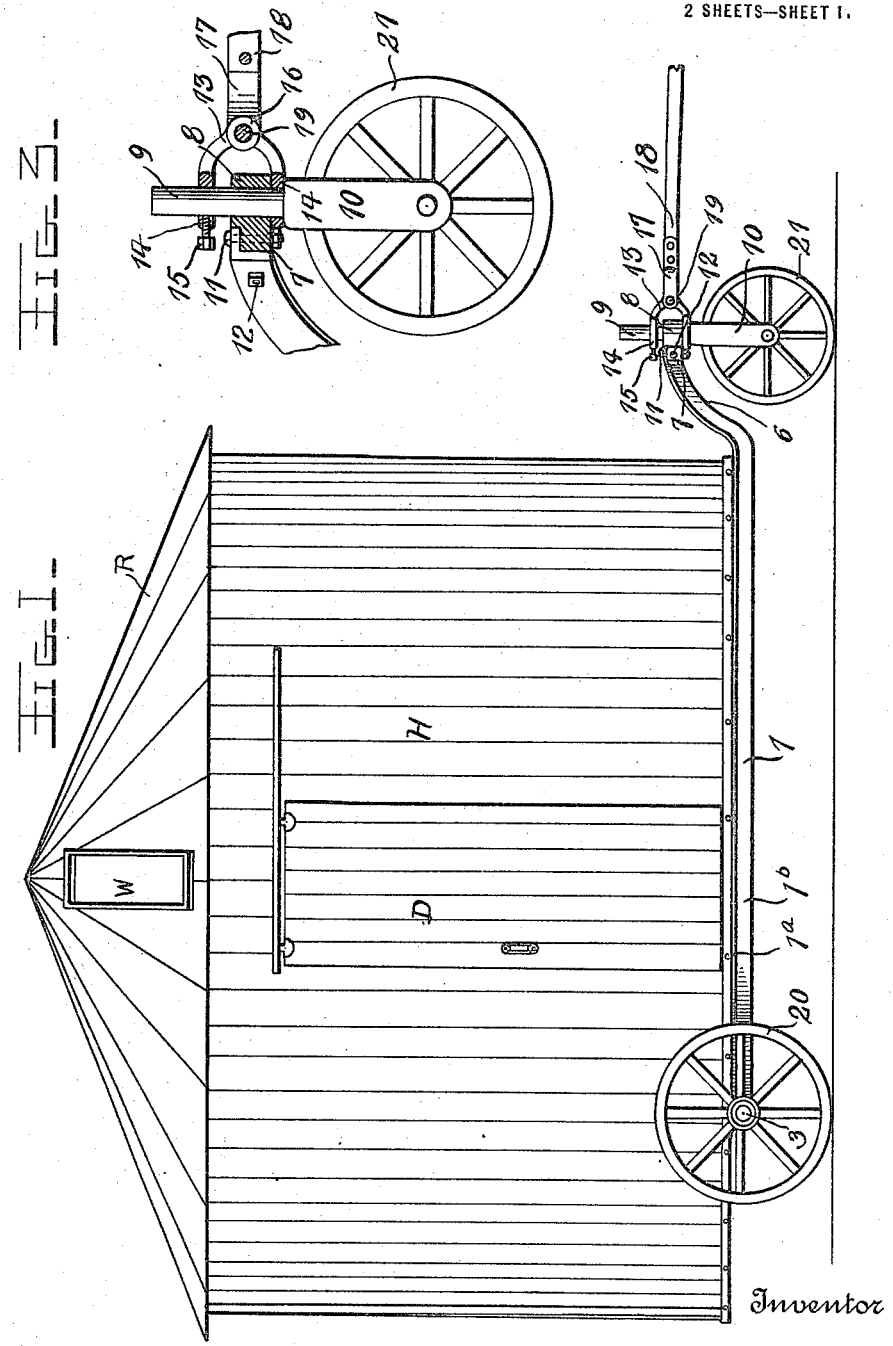

UNITED STATES PATENT OFFICE.

ANDREW A. FAIR, OF NEAR PIERSON, IOWA.

TRUCK FOR COB-HOUSES AND THE LIKE.

1,183,362.  Specification of Letters Patent.  Patented May 16, 1916.

Application filed April 26, 1915. Serial No. 23,996.

*To all whom it may concern:*

Be it known that I, ANDREW A. FAIR, a citizen of the United States, residing near Pierson, in the county of Cherokee and State of Iowa, have invented certain new and useful Improvements in Trucks for Cob-Houses and the like; and I do declare the following to be a full, clear, and exact description of the invention, such as will enable others skilled in the art to which it appertains to make and use the same.

My invention relates broadly to improvements in trucks, and specifically to a device of this class constructed primarily for the transportation of cob houses and the like from the corn sheller to a point at which the cobs may be removed and used from time to time as fuel.

The object of the invention is to provide a device of the class set forth which will be simple, strong and efficient in operation, and which will possess a number of advantageous features, whether used for transporting a cob house, or for other purposes.

With this general object in view, the invention resides in certain novel features of construction and in combinations of parts hereinafter described and particularly pointed out in the appended claims.

In describing the invention, I shall refer to the accompanying drawings wherein like reference characters designate corresponding parts throughout the various views and wherein:

Figure 1 is a side elevation of a truck constructed in accordance with my invention showing a cob house supported thereon; Fig. 2 is a bottom plan view; Fig. 3 is an enlarged vertical longitudinal section showing more particularly the connection of the front steering wheel with the truck frame; and Fig. 4 is a disassembled perspective view of the parts shown in Fig. 3. Fig. 5 is a detail longitudinal section through one end of the rear axle and the foot secured thereto.

In these drawings, constituting a part of the application, the numerals 1 designate two longitudinally disposed horizontal side bars formed of angle-iron having their horizontal flanges 1ª extended outwardly from the upper edges of their upright flanges 1ᵇ, the two bars 1 having their rear ends bent inwardly toward each other to provide angle-iron attaching feet 2, the horizontal flanges of these feet being disposed in contact with the upper side of a transverse rectangular axle 3, while the upright flanges thereof contact with the front side of said axle as clearly disclosed in Figs. 1 and 2. With the parts in this position, bolts 4 or other appropriate fasteners are passed horizontally through the axle 3 and through the upright flanges contacting therewith. By this means, it will be evident that the rear ends of the side bars 1 are rigidly anchored to the axle and that the latter is positively held against rotation.

From their rear ends the side bars 1 converge forwardly and are curved inwardly into contact with each other at their front ends, as disclosed at 5 in Fig. 2, these front ends being preferably deflected upwardly to the extent shown at 6 in Fig. 1. The horizontal flanges 1ª of the front ends of the side bars 1 are disposed in contact with the upper side of the widened rear end of a casting 7 including an upright bearing 8 receiving the shank 9 of a fork 10, the aforesaid casting being secured to the front ends of the bars 1 by upright bolts 11 passing through the casting and through the horizontal flanges 1ª, and by additional horizontally disposed bolts 12 passing through such casting and through the upright flanges 1ᵇ. Although this is a very simple construction, it will be evident that it is extremely rigid and will be efficient in operation allowing the fork 10 to oscillate horizontally when necessary.

In order to prevent vertical movement of the bearing 8 upon the shank 9, a C-shaped casting 13 is provided having vertically alined bearings 14 at its free ends receiving the shank 9 and disposed above and below the bearing 8, the casting being locked against vertical movement on said shank by a set screw 15 or the like. The curved portion of the C-shaped casting 13 is provided with a horizontally elongated transversely disposed bearing 16 which is embraced by the fork 17 of any preferred type of tongue or other draft device 18, a bolt 19 being passed through said fork and through the bearing 16 as clearly shown.

The truck constructed as above described may be supported upon rear wheels 20 rotatably mounted upon the ends of the axle 3 and upon a front wheel 21 revolubly carried by the fork 10, or may be equipped with a trio of runners disposed at these points, wheels however, being used when the truck is mounted for the transportation of the cob house H from a corn shelling machine to a point remote therefrom, it being understood that the truck with the house thereon is drawn to the machine, filled with corn cobs by the cob carrier thereof and is then drawn to a point adjacent a building having therein stoves or the like in which the cobs are to be burned as they are removed from the house H through any preferred type of door D, the latter being preferably of the sliding type. In addition to this door D, the pointed roof R of the house H is preferably provided with a window W through the cobs are delivered into the interior of said house.

From the foregoing description, taken in connection with the accompanying drawings, it will be evident that an improved simple and inexpensive truck has been provided which may be applied to a number of uses, although as hereinbefore suggested, it is preferably used for the transportation of a cob house. Particular emphasis is laid upon the unique features of construction associated with both the front and rear ends of the side bars 1, it being evident that these bars constitute a frame or cradle for the body or bodies to be carried by the truck.

I claim:

1. In combination, a portable frame, an upright bearing disposed at the front end thereof, an upright supporting shank inserted through said bearing, a draft member having vertically alined bearings receiving the shank and disposed one above and one below the aforesaid bearing, and means retaining said draft member against movement upon the shank.

2. In combination, a portable frame, an upright bearing disposed at the front end thereof, an upright supporting shank inserted through said bearing, a draft member having a pair of vertically alined bearings receiving the shank and disposed above and below the aforesaid bearing, a third and horizontally disposed bearing on said draft member for the attachment of a tongue, and means for locking the pair of bearings of the aforesaid draft member against vertical movement on the shank.

3. In combination, a portable frame, an upright bearing disposed at the front end thereof, an upright supporting shank inserted through said bearing, a pair of additional bearings receiving the shank and disposed one above and one below the aforesaid bearing, a C-shaped draft member formed integrally with and projecting forwardly from said pair of bearings, and means locking the latter against vertical movement on the shank.

4. In combination, a portable frame, an upright bearing disposed at the front end thereof, an upright supporting shank inserted through said bearing, a pair of additional bearings receiving the shank and disposed one above and one below the aforesaid bearing, a C-shaped draft member formed integrally with and projecting forwardly from said pair of bearings, means locking said pair of bearings against vertical movement on the shank, and a horizontally disposed bearing formed integrally with the aforesaid draft member.

In testimony whereof I have hereunto set my hand in presence of two subscribing witnesses.

ANDREW A. FAIR.

Witnesses:
WIER R. MILLS,
S. F. BENSON.

Copies of this patent may be obtained for five cents each, by addressing the "Commissioner of Patents, Washington, D. C."